United States Patent [19]

Stana et al.

[11] Patent Number: 4,938,576
[45] Date of Patent: Jul. 3, 1990

[54] DEVICE FOR GENERATING AN OPTICAL COLLIMATING BEAM

[75] Inventors: Hans Stana, Oberkochen; Werner Renner, Heidenheim, both of Fed. Rep. of Germany

[73] Assignee: Carl-Zeiss-Stiftung, Heidenheim/Brenz, Fed. Rep. of Germany

[21] Appl. No.: 398,646

[22] Filed: Aug. 25, 1989

[30] Foreign Application Priority Data

Sep. 1, 1988 [DE] Fed. Rep. of Germany ....... 3829707

[51] Int. Cl.$^5$ ...................... G02B 17/00; G02B 17/08; G02B 27/00
[52] U.S. Cl. .................................. 350/574; 350/576; 350/445
[58] Field of Search ............... 350/574, 576, 445, 418, 350/600, 631

[56] References Cited

U.S. PATENT DOCUMENTS 4,704,010 11/1987 Stana et al. .

FOREIGN PATENT DOCUMENTS 1257039 12/1967 Fed. Rep. of Germany .

Primary Examiner—Jon W. Henry
Attorney, Agent, or Firm—Walter Ottesen

[57] ABSTRACT

The invention is directed to a device for generating an optical collimating beam having a defined angle with respect to a base when mounted thereon even in the presence of extreme mechanical and thermal loads. The device can be used for testing long guideways on machine tools, for example. The device includes a housing wherein a collimator is mounted in a form-tight manner for imaging a collimating mark out to infinity. The collimator is configured as a mirror system and includes several components connected tightly to each other. These components define a chamber filled with a gaseous medium and through which the imaging beam path extends. The collimator functions without problems even in the presence of extreme mechanical and thermal loads and, most importantly, is insensitive to temperature changes.

9 Claims, 1 Drawing Sheet

DEVICE FOR GENERATING AN OPTICAL COLLIMATING BEAM

FIELD OF THE INVENTION

The invention relates to a device for generating an optical collimating beam having a defined angle with respect to a base when mounted thereon even in the presence of extreme mechanical and thermal loads.

BACKGROUND OF THE INVENTION

Such devices are utilized for testing long guideways in machine tools and for determining angle deviations between the axes of parts of large machines. In this context, the device acts as an adjusting collimator whose collimating beam is observed with the aid of an appropriately configured telescope. If the collimating mark imaged by the adjusting collimator to infinity is so configured that it supplements a collimating mark in the telescope to a symmetrical figure, then deviations can be easily detected which occur during rough operation and can be measured by an appropriate calibration. Depending upon the type of machine, extreme mechanical and even thermal loads can be applied to the adjusting collimator.

A further advantageous application of such devices is the monitoring of the spatial position of the opening of the barrel of a weapon such as a cannon. For this purpose, the device is placed at the vicinity of the barrel opening and the collimating beam emitted by the device reaches a target apparatus. The target line of this apparatus is set at a precisely predetermined angle to the axis of the cold barrel during adjustment. For this purpose, an adjusting device is introduced into the barrel of the cannon as explained, for example, in German Patent No. 1,257,039. After adjustment is completed, the target beam of the device, running opposite to the direction of the projectile, reaches a predetermined position in the target apparatus with the device here being used again as an adjusting collimator.

The barrel becomes hot during the firing of the projectiles and can therefore bend so that the axis of the barrel opening which determines the flight direction of the projectile is changed with respect to its spatial position. This becomes manifest in a deviation of the collimator target beam from its desired position so that the target apparatus can be correspondingly readjusted. Thereafter, the target beam again takes on its correct position with reference to the axis of the barrel opening.

In the above application, the mechanical and thermal load on the adjusting collimator is especially large. Accordingly, forces develop in the region of the cannon opening which can even exceed 40,000 g.

U.S. Pat. No. 4,704,010 is incorporated herein by reference and discloses a device of the kind described above wherein a single-lens objective is mounted in a metal housing connected in a form-tight manner to the support. The single-lens objective has a first optical surface upon which an illuminated collimating mark is arranged and a second optical surface lying opposite the first optical surface. The central region of the second optical surface is provided with a reflective coating and the single-lens objective is made of a material having a linear coefficient of expansion of less than $10^{-6} K^{-1}$. The single-lens objective is held in the housing in a form-tight manner with a layer of elastic material that permanently retains its elasticity. This layer surrounds the peripheral surface of the objective.

This device fulfills all requirements as to stability and reliability of the adjusted condition which result from extreme mechanical and thermal loading.

However, it has been shown that temperature changes lead to a deterioration of the imaging quality of the adjusting collimator which can become disturbing for high values of temperature difference.

This effect can be attributed to the condition that for the known device the actual imaging beam path in the collimator runs within a compact optical medium whose refractive power changes in dependence upon its temperature. In this way, inhomogeneities occur in the optically effective portion of the collimator in the presence of local temperature differences in the optical medium and these inhomogeneities diminish the imaging quality. Such local uneven temperatures in the optical medium occur because, even though this medium has an extremely low linear coefficient of expansion, it does have a relatively low heat conducting capability. For this reason, a uniform temperature develops in the optical medium of the collimator only very slowly when there is a temperature change of the base to which the device is connected.

A reduction in the imaging quality develops especially when the device is mounted in the region of the barrel opening of a cannon.

SUMMARY OF THE INVENTION

It is an object of the invention to provide a device for generating an optical collimating beam having a defined angle with respect to a base when mounted thereon even in the presence of extreme mechanical and thermal loads. It is a further object of the invention to configure this device in such a manner that an excellent imaging quality of the collimator is assured even in the presence of rapid and large temperature changes.

The device of the invention generates an optical collimating beam having a defined angle with respect to a base when mounted thereon even in the presence of extreme mechanical and thermal loads. The device of the invention includes: a housing connected to the base in a form-tight manner; collimating mark means arranged in the housing; a mirror system including a plurality of optical components arranged in the housing to conjointly define a collimator defining an imaging beam path along which the collimator images the collimating mark means out to infinity; at least one of the optical components being a concave mirror; the concave mirror and the remaining ones of the optical components conjointly defining a space through which the imaging beam path extends; a gaseous medium filling the space; means for joining the components to form a compact unit; and, elastic means having permanent elasticity and being disposed between the optical components and the housing for holding the components in the housing.

Thus, it is a feature of the invention that the imaging beam path runs in a space which is filled with a gaseous medium. This gaseous medium can preferably be air. A gaseous medium changes its refractive index only very slightly in dependence upon temperature. Furthermore, the gaseous medium has a relatively good heat conducting capability and has a high light transmittance. For these reasons, the gaseous medium influences the optically effective portion of the imaging beam path in an insignificant manner even in the presence of temperature changes.

Imaging the collimating mark out to infinity in the device according to the invention is achieved with a mirror system. In order to achieve a trouble-free imaging with such a system, it is sufficient if the system components fulfill the conditions that they have an exceptionally low heat expansion. Such components are therefore preferably made of ceramic such as the glass ceramic available in the Federal Republic of Germany under the trade name ZERODUR.

The concave mirror of the device according to the invention defines an optical axis. The concave mirror has a focal point on this axis and has a predetermined focal length. According to another feature of the invention, a second one of the components is a plane-parallel plate arranged on this optical axis so as to be spaced from the concave mirror a distance corresponding to one half of the focal length. The plane-parallel plate has a central region and a peripheral region surrounding this central region. A reflective coating is provided on the central region for reflecting an image of the collimating mark along the imaging beam path. On the other hand, the peripheral region is uncoated so as to permit the image to be reflected out to infinity by the concave mirror. The thickness of this plate referred to the overall length of the beam path is small so that this plane-parallel plate is non-critical with reference to changes in the index of refraction caused by temperature conditions.

According to still another feature of the invention, the concave mirror of the collimator is provided with a central through-bore arranged along the optical axis of the mirror. A transparent plate is securely mounted to a flat rear surface of the mirror. The collimating mark is then disposed on this plane-parallel plate so as to be located at the optical axis.

In lieu of the plane-parallel plate, a transparent body can be securely mounted in the bore with the collimating mark being disposed thereon at the location of the optical axis.

According to a still further embodiment of the invention, a light source is provided to illuminate the collimating mark.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
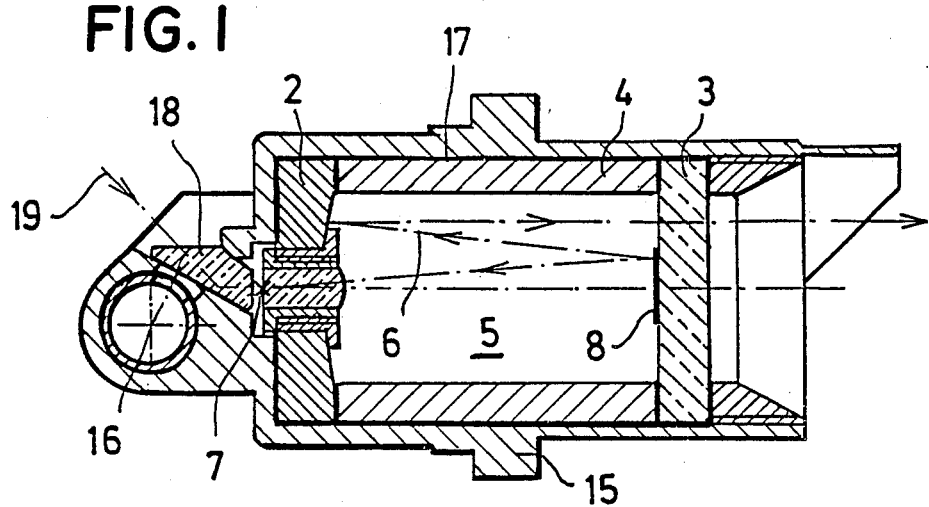
FIG. 1 is a longitudinal section taken through an embodiment of the device according to the invention.

In FIG. 1, reference numeral 15 indicates a housing which is preferably a metal housing which is connected to a base in a form-tight manner. This base can, for example, be the barrel of a cannon. The attachment of the housing to the base can be as shown in U.S. Pat. No. 4,704,010. The actual adjusting collimator 1 is mounted in the housing 15 in a form-tight manner and is held in the housing via means 17 having a permanent elasticity.

The adjusting collimator 1 comprises a concave mirror 2 having a focal point at which the collimating mark 7 is arranged. A plane-parallel plate 3 is spaced from the concave mirror a distance corresponding to half of the focal length of the mirror. The central region 8 of the plane-parallel plate 3 is provided with a fully reflective coating. The peripheral region of the plate 3 is uncoated and permits the imaging beam path 6 to exit from the adjusting collimator 1. A cylindrically-shaped component 4 fixes the spacing between the mirror 2 and the plate 3. The three optical components (2, 3 and 4) conjointly define a compact unit. For this purpose, the three components (2, 3 and 4) are joined to each other with a suitable means such as an adhesive.

A hollow chamber 5 is conjointly defined by the three components (2, 3 and 4) and is filled with a gas which is preferably air and through which the imaging beam path 6 extends.

A light source 16 is mounted in the housing 15 itself and illuminates the collimating mark 7. For this purpose, the light emanating from the light source 16 is redirected toward the collimating mark 7 via a prismatic component 18. The prismatic component 18 is configured so that daylight can be used to illuminate the collimating mark 7 as indicated by the arrow 19.

Figure 2:
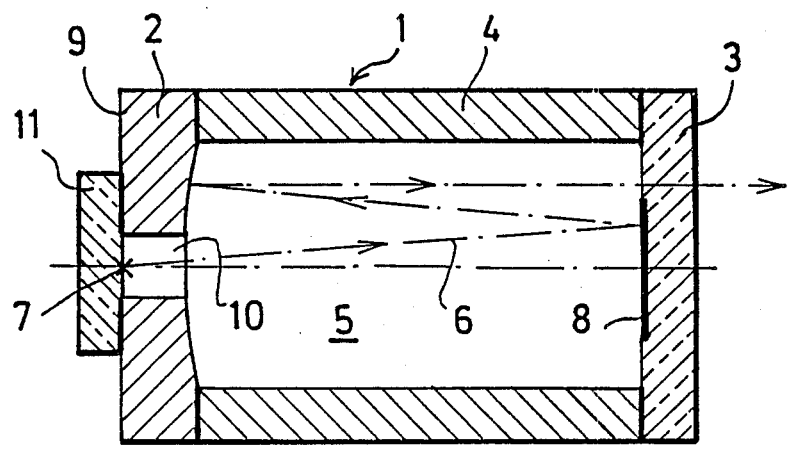
FIG. 2 is a longitudinal section view of an alternate embodiment of the adjusting collimator contained in the device of FIG. 1.

The embodiment of the adjusting collimator 1 illustrated in FIG. 2 includes a concave mirror 2 having a planar rearward surface 9 and a central bore 10. A transparent plate 11 is mounted on the rearward surface 9 of the mirror 2 and is securely joined to the mirror 2. This plate 11 carries the collimating mark 7 at the focal point of the concave mirror 2. The collimating mark can be illuminated by a separate light source 16 as well as by daylight 19 in the manner shown in the embodiment of FIG. 1.

Figure 3:
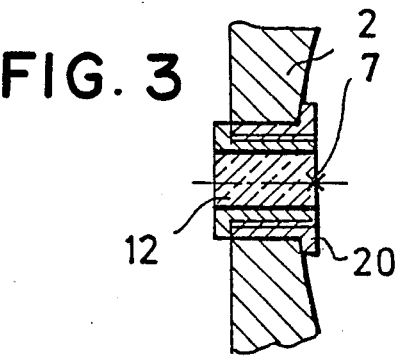
FIG. 3 is a partial section view taken through the concave mirror of the adjusting collimator to show an alternate configuration of the component carrying the collimating mark; and, FIG. 4 corresponds to the view shown in FIG. 3 and shows an alternate component for carrying the collimating mark.

In the embodiment of FIG. 3, a transparent component 12 is mounted in the bore 10 of the concave mirror 2 and carries the collimating mark 7. This transparent component 12 can be displaced in the direction of the optical axis of the mirror 2 to facilitate the adjustment. After the adjustment is completed, the transparent component 12 can be tightly fixed by means of the threaded element 20 thereby fixing the latter in the adjusted position.

Figure 4:
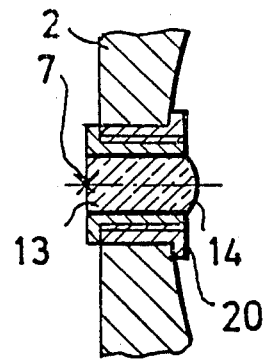

The embodiment shown in FIG. 4 includes a transparent component 13 which is mounted in the bore 10 of the concave mirror 2. The transparent component 13 carries the collimating mark 7 and has an optically effective surface 14. The use of such a component facilitates the adjustment. The embodiment of the transparent element 13 shown in FIG. 4 is utilized in the embodiment of the device shown in FIG. 1.

Only the components (11, 12, 13, 18 and 3) must be light transparent in the embodiment of the adjusting collimator shown in the drawing. If these components have thermally conditioned inhomogeneities, this is of no significance with respect to the quality of the imaging beam path. This insensitivity is present since the thickness of the plane-parallel plate 3 referred to the overall length of the beam path 6 is small.

Basically, the components (2 and 4) can be made of an opaque material such as ceramic. The components which must be transparent are preferably made of the glass ceramic available under the trade name ZERODUR.

It is understood that the foregoing description is that of the preferred embodiments of the invention and that various changes and modifications may be made thereto without departing from the spirit and scope of the invention as defined in the appended claims.

What is claimed is:

1. A device for generating an optical collimating beam having a defined angle with respect to a base when mounted thereon even in the presence of extreme mechanical and thermal loads, the device comprising:

a housing connected to the base in a form-tight manner;

collimating mark means arranged in said housing;

a mirror system including a plurality of optical components arranged in said housing to conjointly define a collimator defining an imaging beam path along which said collimator images said collimating mark means out to infinity;

at least one of said optical components being a concave mirror;

said concave mirror and the remaining ones of said optical components conjointly defining a space through which said imaging beam path extends;

a gaseous medium filling said space;

means for joining said components to form a compact unit; and, elastic means having permanent elasticity and being disposed between said optical components and said housing for holding said components in said housing.

2. The device of claim 1, said optical components being made of a material having a linear coefficient of expansion less than $10^{-6} \cdot K^{-1}$.

3. The device of claim 2, further comprising light supply means for illuminating said collimating mark means.

4. A device for generating an optical collimating beam having a defined angle with respect to a base when mounted thereon even in the presence of extreme mechanical and thermal loads, the device comprising:

a housing connected to the base in a form-tight manner;

collimating mark means arranged in said housing;

a mirror system including a plurality of optical components arranged in said housing to conjointly define a collimator defining an imaging beam path along which said collimator images said collimating mark means out to infinity;

a first one of said components being a concave mirror defining an optical axis, said concave mirror having a focal point on said axis and having a predetermined focal length;

said collimating mark means being disposed at said focal point;

a second one of said components being a plane-parallel plate arranged on said axis so as to be spaced from said concave mirror a distance corresponding to one-half of said focal length;

said plane-parallel plate having a central region and a peripheral region surrounding said central region;

reflective means formed on said central region for reflecting an image of said collimating mark means along said imaging beam path;

said peripheral region being uncoated so as to permit said image to be reflected out to infinity by said concave mirror;

a third one of said components being a cylindrically shaped body for fixing the spacing between said first and second components and for joining said components into a compact unit;

said components conjointly defining an enclosed chamber for holding a gaseous medium therein; and, elastic means having permanent elasticity and being disposed between said optical components and said housing for holding said components in said housing.

5. The device of claim 4, said optical components being made of a material having a linear coefficient of expansion less than $10^{-6} \cdot K^{-1}$.

6. The device of claim 5, said concave mirror having a concave reflecting surface facing toward said plane-parallel plate and a planar surface facing away from said plate; said concave mirror having a through bore formed therein along said axis; said device further comprising a transparent plate securely connected to said planar surface; and, said collimating marking means being disposed on said transparent plate at said axis.

7. The device of claim 5, said concave mirror having a through bore formed therein along said axis; said device further comprising a transparent body securely mounted in said bore; and, said collimating mark means being disposed on said transparent body at said axis.

8. The device of claim 7, said transparent body having at least one optically effective surface.

9. The device of claim 5, further comprising light supply means for illuminating said collimating mark means.

* * * * *